(12) United States Patent
Jense

(10) Patent No.: US 6,191,383 B1
(45) Date of Patent: Feb. 20, 2001

(54) WELDING DEVICE

(75) Inventor: Willem Frederik Jense, De Lutte (NL)

(73) Assignee: Omega Laser Systems B.V., Enschede (NL)

( * ) Notice: Under 35 U.S.C. 154(b), the term of this patent shall be extended for 0 days.

(21) Appl. No.: 09/297,994

(22) PCT Filed: Nov. 11, 1997

(86) PCT No.: PCT/NL97/00617

§ 371 Date: Jul. 16, 1999

§ 102(e) Date: Jul. 16, 1999

(87) PCT Pub. No.: WO98/26898

PCT Pub. Date: Jun. 25, 1998

(30) Foreign Application Priority Data

Nov. 11, 1996 (NL) .................................................. 1004483

(51) Int. Cl.⁷ .................................................. B23K 26/14
(52) U.S. Cl. .............................. 219/121.63; 219/121.61; 219/86.22; 219/79; 219/531; 219/388
(58) Field of Search .......................... 219/121.63, 121.61, 219/388, 531, 79, 86.22

(56) References Cited

U.S. PATENT DOCUMENTS

| | | | |
|---|---|---|---|
| 4,650,954 | * | 3/1987 | Frings et al. . |
| 4,654,505 | * | 3/1987 | Sciaky et al. . |
| 5,023,427 | * | 6/1991 | Neilheisel et al. . |
| 5,674,420 | * | 10/1997 | Broderick et al. . |
| 5,902,497 | * | 5/1999 | Alber et al. . |

FOREIGN PATENT DOCUMENTS

| | | |
|---|---|---|
| 0136190 | 4/1985 | (EP) . |
| 0189806 | 8/1986 | (EP) . |
| 0452137 | 10/1991 | (EP) . |
| 0743129 | 11/1996 | (EP) . |
| 2549759 | * 7/1983 | (FR) . |

\* cited by examiner

*Primary Examiner*—Patrick Ryan
*Assistant Examiner*—Colleen Cooke
(74) *Attorney, Agent, or Firm*—Webb Ziesenheim Logsdon Orkin & Hanson, P.C.

(57) ABSTRACT

A device for mutually connecting by laser welding of sheet-metal objects laid flat against each other at least in determined zones, for instance two or more flat or previously profiled plates, for instance stainless steel or other objects for mutual connection by laser welding, comprising: a welding station comprising a laser and an optical device for performing a laser welding operation using a laser beam via a preselected path consisting for instance of a plurality of sub-paths; clamping means, for instance a lower clamping plate and an upper clamping beam for clamping against each other at least said regions, of the objects at the location of the welding station; transporting means for supplying and carrying successive assemblies of objects laid on top of each other according to a chosen displacement pattern along the welding station, which transporting means comprise two separate conveyors, wherein the welding station is a collective one for both conveyors and respective individual clamping means are added to each conveyor; and a central control unit for controlling the transporting means and the welding station in mutual coordination such that the conveyors operate for transport at least partially in mutual alternation such that the welding station can operate in the region of the one conveyor while the other conveyor operates for transport.

12 Claims, 3 Drawing Sheets

WELDING DEVICE

BACKGROUND OF THE INVENTION

The invention relates to a device for mutually connecting by welding of sheet-metal objects, for instance flat plates. The use of laser welding for this purpose is known. The use of a laser is necessary herefor. Suitable lasers capable of generating infrared radiation of the desired wavelength range are for instance YAG lasers or $CO_2$ lasers. By means of optical means, for instance lenses, mirrors or the like, a very intense beam of infrared radiation is directed at the weld location. The beam is of the convergent type and the weld location will generally be situated roughly in the focal spot of the optical system.

A laser is a very expensive apparatus. In the mutual connection of for instance stainless steel plates by laser welding the drawback is encountered that, even with automatic control, it is not possible to avoid the laser being cut of use for a time, for instance during transport for feed and outfeed of assemblies of objects to be joined together. In view of the relatively very high price of the laser, it is desirable to increase the time for which the laser is effectively in use.

SUMMARY OF THE INVENTION

With a view to this objective, the invention provides a device for mutually connecting by laser welding of sheet-metal objects laid flat against each other at least in determined zones, for instance two or more flat or previously profiled plates, for instance stainless steel or other objects for mutual connection by laser welding, which device comprises:

- a welding station comprising a laser and an optical device for performing a laser welding operation using a laser beam via a preselected path consisting for instance of a plurality of sub-paths;
- clamping means, for instance a lower clamping plate and an upper clamping beam, for clamping against each other at least said regions of the objects at the location of the welding station;
- transporting means for supplying and carrying successive assemblies of objects laid on top of each other according to a chosen displacement pattern along the welding station, which transporting means comprise two separate conveyors, wherein the welding station is a collective one for both conveyors and respective individual clamping means are added to each conveyor; and
- a central control unit for controlling the transporting means and the welding station in mutual coordination such that the conveyors operate for transport at least partially in mutual alternation such that the welding station can operate in the region of the one conveyor while the other conveyor operates for transport.

The objects must be mutually connected for instance in a regular pattern of annular weld zones and linear weld zones, for instance to manufacture per se known heat exchangers. In order to obtain a great freedom of welding patterns it is necessary that the laser beam can operate at all relevant locations of the surfaces for processing. An annular weld zone can be made for instance by causing the welding station to make the associated movement.

In this respect the device preferably has the feature that the laser beam is displaceable in transverse direction of each conveyor.

The device can also have the feature that the laser beam is displaceable in longitudinal direction of each conveyor.

The combination of the two above stated features produces a considerable freedom of movement of the laser station.

The transporting means can however also be used to produce a welding path in longitudinal direction of the conveyors. In this respect the invention provides a variant in which each conveyor is also controllable together with the clamping means on the basis of a chosen path. It will be apparent that this variant can also be combined with the freedom of movement of the welding station.

An accurate positioning can be ensured with an embodiment in which at least one lateral guide, for instance guide rollers, is added to each conveyor.

In order to make the non-operational time of the laser as short as possible during displacement from this one conveyor to the other conveyor, the invention provides a variant in which the conveyors are mutually parallel and extend adjacently of each other.

The depth of the weld zone need only be so great that the objects are welded to each other effectively and reliably at that location. In order to obtain an effective heat discharge and to avoid the weld zone acquiring too great a depth and the weld zone extending to the bottom surface of the assembly, it may be favourable for the device to be provided with a cooled support plate present in the region of the welding station and forming part of the clamping means. Such a support plate can be provided with cooling ducts through which flows heat transfer medium.

An effective strengthening of the clamping force and a very positive positioning of an assembly is obtained with an embodiment in which the support plate takes an electromagnetic form. During operation of the or each electromagnet the assembly is positioned non-movably relative to the support plate. If the support plate is fixedly disposed, a chosen welding path can only be realized with the associated freedom of movement of the welding station.

Since a laser is a vulnerable and comparatively heavy instrument, it can be recommended in some conditions for the laser to be disposed fixedly. With known means the infrared beam generated by the laser can be guided via an optical device to the chosen welding location. The optical system required for this purpose can be controlled accordingly by means of an adapted control by the central control unit. Use can for instance be made of fast stepping motors. Not only can such a "flying optical device" respond very rapidly because it is so light, but it also requires relatively little displacement energy due to the low inertia.

The clamping means, which may comprise for instance a lower clamping plate and upper clamping beams, must leave clear the chosen welding zones. After the forming of a weld zone in the assembly on the one conveyor, the optical device must be displaced as rapidly as possible to the other conveyor in order to process an assembly already present there. The clamping beams are necessarily of heavy construction, this requiring considerable dimensions. Insofar as the focal distance of the optical device allows, vertical displacement of the optical device is avoided. If desired, a vertical displaceability can also be realized to avoid the danger of collision with the clamping beams.

The device according to the invention lends itself to improving the effective efficiency of the laser. It is essential for this purpose to embody the software of the central control unit such that the laser co-acts in alternating manner with the one conveyor and with the other conveyor, whereby its non-operational periods can be considerably shorter than in the case of a welding device added to only one conveyor.

BRIEF DESCRIPTION OF THE DRAWINGS

The invention will now be elucidated with reference to the annexed drawings. Herein.

DETAILED DESCRIPTION OF THE PREFERRED EMBODIMENTS

Figure 1:
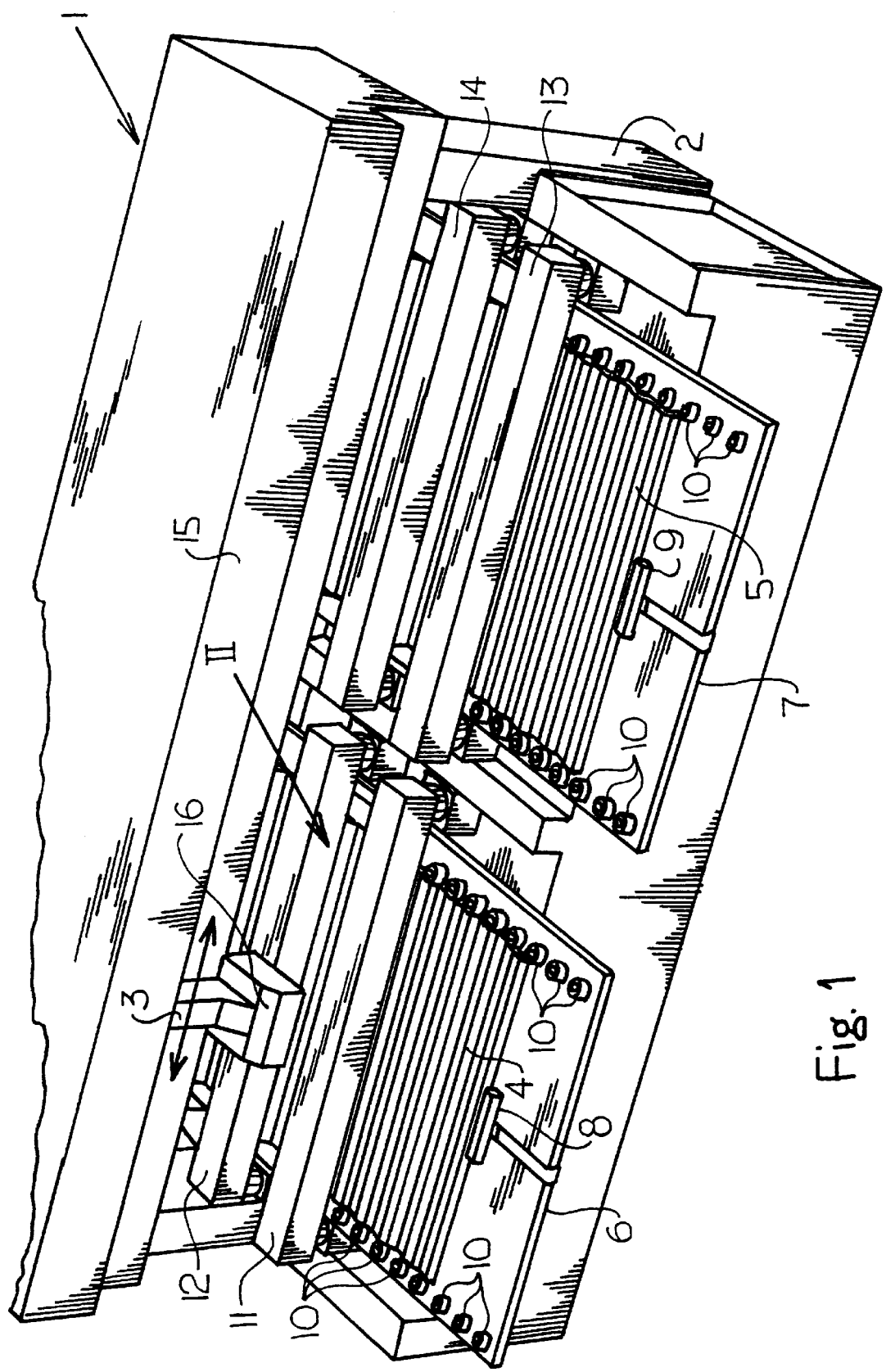
FIG. 1 shows a highly schematic perspective view of a device according to the invention.

FIG. 1 shows a device 1 for mutual connection by laser welding of sheet-metal objects laid flat against each other at least in determined zones.

The device comprises a frame 2 which bears a carriage 3 by means of a guide (not shown), in which carriage are arranged optical means for generating a convergent laser beam in downward direction for the purpose of welding together two stainless steel plates together forming an assembly 4, 5. These plates are transported over respective tables 6, 7 by pushers 8, 9. Free-turning rollers generally designated with 10 serve as lateral guide.

The device 1 further comprises clamping means comprising clamping beans 11, 12; 13, 14 co-acting with tables 6, 7. These clamping beams extend in the region of carriage 3. Not shown is that in the housing 15 forming part of the frame is accommodated a laser which via per se known means transmits a parallel source of infrared radiation to carriage 3 where this beam is converted by optical means into a downward converging beam such that at the position of the assembly 4, 5 a welding operation can be performed. During this welding operation the clamping beams 11, 12 or 13, 14 are pressed downward with force, whereby the relevant assembly 4 respectively 5 is positioned non-movably on the respective table 6, 7.

Figure 3:
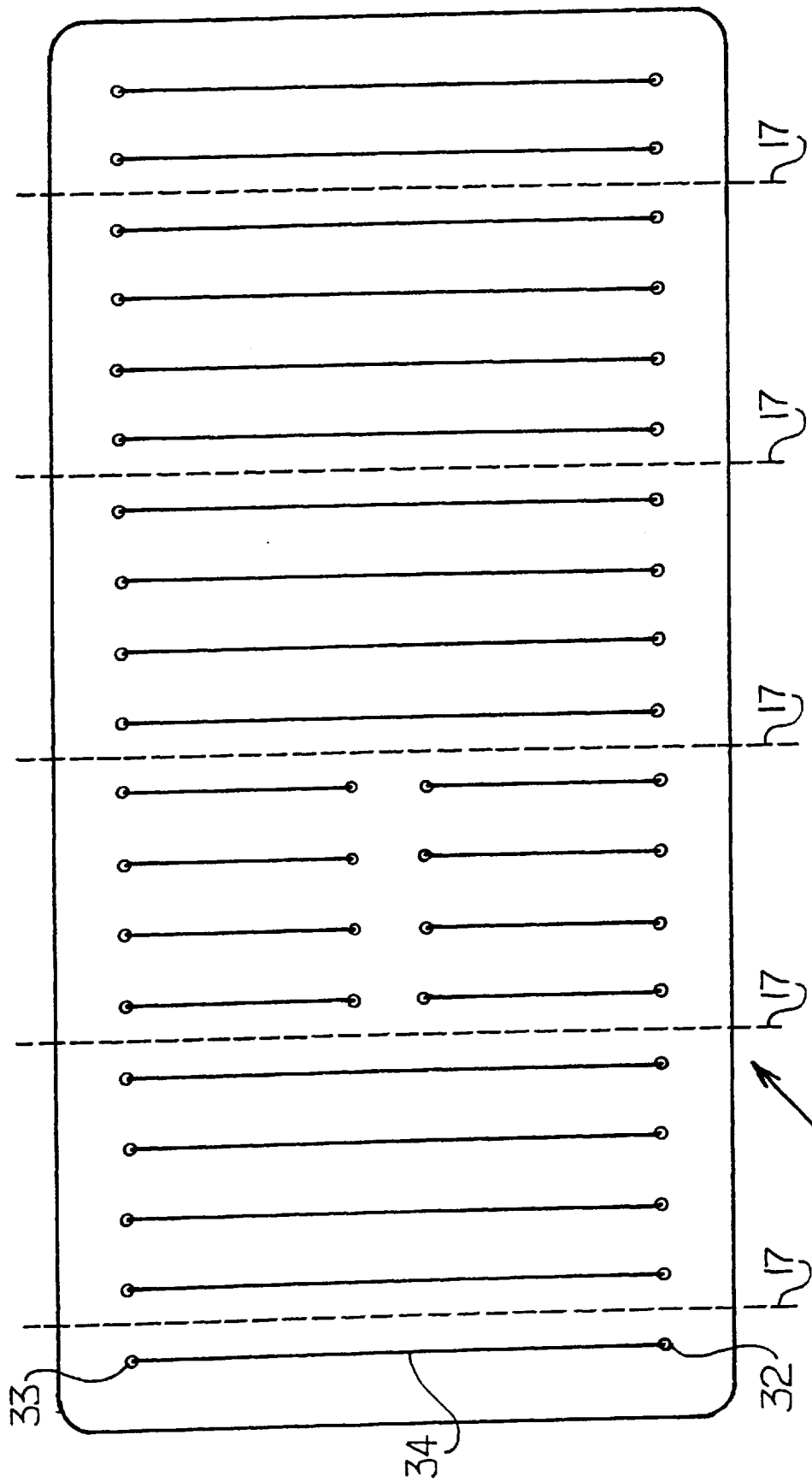
FIG. 3 is a top view of two flat plates welded together by a device as according to FIG. 1.

At the moment when, as according to FIG. 1, the carriage is situated in the region of table 6, clamping beams 11, 12 are activated and laser source 16 can carry out the required welding operations under program control via a central control unit (not shown). The optical device 16 is embodied for this purpose such that it is not only movable with carriage 3 but also relative to the carriage itself, whereby practically the whole area between clamping beans 11, 12 can be covered for a welding operation. Reference is made now in this respect to FIG. 3 in which broken lines 17 indicate the confines within which welding operations can be performed as according to the pattern drawn in FIG. 3 during one uninterrupted clamping of assembly 4.

When the welding operation in the region of table 6 is completed, carriage 3 is displaced under program control to the corresponding position between clamping beams 13, 14 in the region of table 7. Clamping beams 13, 14 have by then already been placed in their clamping active position, so that under program control the optical device 16 can begin the required welding operations according to the program without dead time. While these operations take place the clamping by clamping beams 11, 12 is released and the pusher 18 pushes assembly 4 to the following weld zone over a distance which corresponds with the mutual distance between boundary lines 17 according to FIG. 3.

An assembly 4, 5 is thus subjected to welding operations and transported in mutual alternation.

Figure 2:
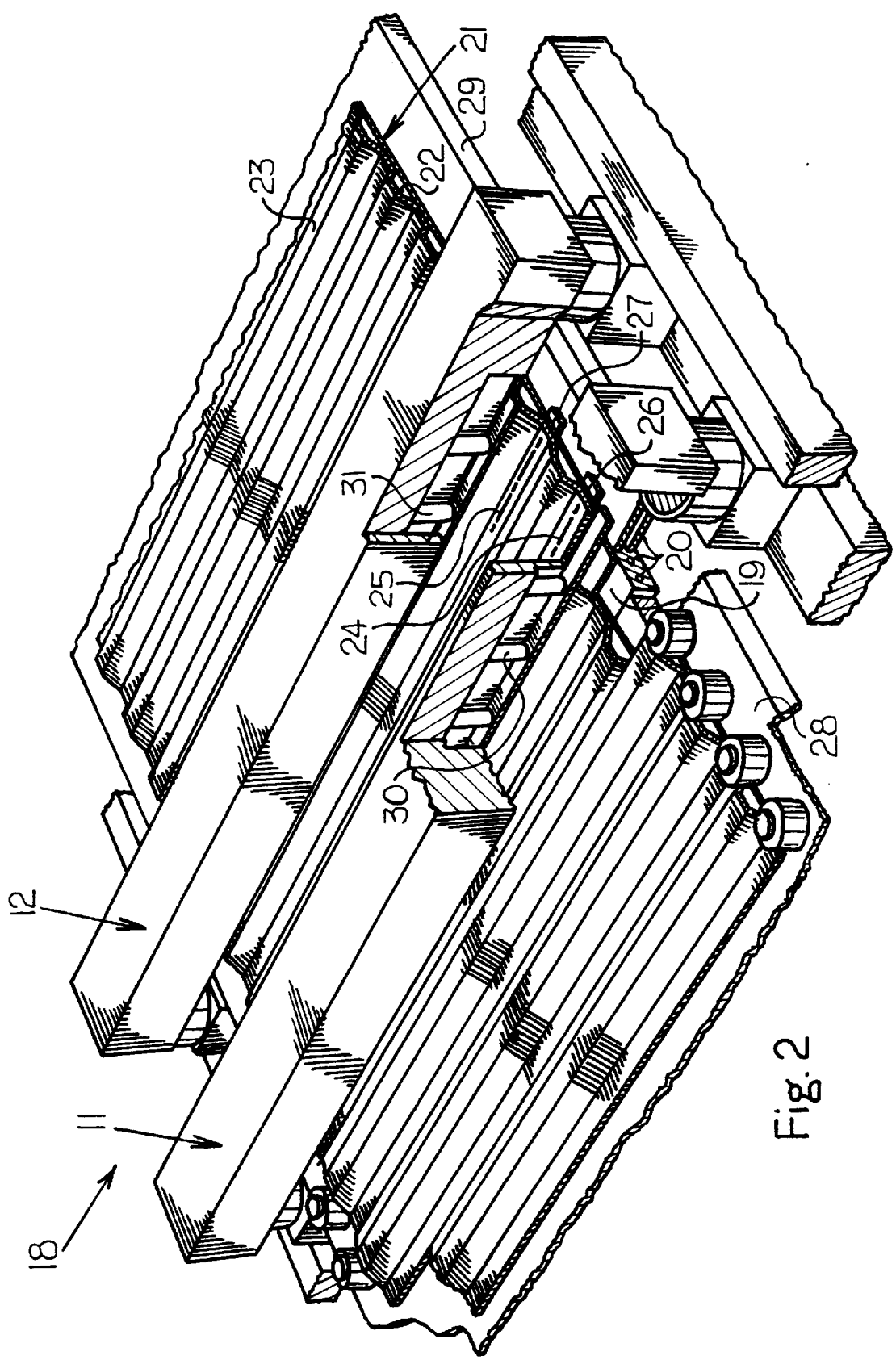
FIG. 2 shows a schematic cross-sectional view through the welding station.

FIG. 2 shows that a device 18 can be provided with a support plate 19 in which cooling ducts 20 are present. An assembly 21 comprising a flat lower plate 22 and a previously profiled upper plate 23 is clamped by support beans 11, 12. The flat zones 24, 25 clamped onto each other are mutually connected by laser welding via weld zones 26, 27. Present on either side of cooling plate 19 are positioning plates 28, 29 which are provided with internal electromagnets, whereby the in this case ferromagnetic assembly 21 can be pulled with force against plates 28, 29. This attraction is released by switching off the relevant electromagnets.

FIG. 2 further shows that clamping beams 11, 12 are provided with pressure springs 30, 31 respectively.

FIG. 3 shows by way of random example a number of welding patterns.

As discussed above, assembly 4 is repeatedly transported by pusher 8 over a distance corresponding with the mutual distance between dashed lines 17. The patterns shown are only random examples and each comprise two annular end zones 32, 33 and a linear weld zone 34 mutually connecting these weld zones. Maximum strength is obtained when this weld zone 34 extends inside the annular weld zones 32, 33.

As FIG. 3 shows, the linear weld zones may also have a length other than the shown full length. Other linear and circular forms are of course also possible subject to the set technical requirements. It is further noted that the assembly 4 can be applied for instance as panel through which heat transfer medium can flow, and therefore be used as heat exchanger. In this case the peripheral edges of the assembly must be wholly fused by welding. It will be apparent that such weld fusing can also be realized in simple manner with the device 1 according to the invention.

What is claimed is:

1. A device for mutually connecting by laser welding of sheet-metal objects laid flat against each other at least in determined regions, which device comprises:

a welding station comprising a laser and an optical device for performing a laser welding operation using a laser beam via a preselected path;

clamping means for clamping against each other at least said regions of the objects at the location of the welding station;

transporting means for supplying and carrying successive assemblies of objects laid on top of each other according to a chosen displacement pattern along the welding station, which transporting means comprise two separate conveyors, wherein the welding station is a collective one for both conveyors and respective individual clamping means are added to each conveyor; and a central control unit for controlling the transporting means and the welding station in mutual coordination such that the conveyors operate for transport at least partially in mutual alternation such that the welding station can operate in the region of the one conveyor while the other conveyor operates for transport.

2. The device as claimed in claim 1, wherein the laser beam is displaceable in a transverse direction of each conveyor.

3. The device as claimed in claim 1, wherein the laser beam is displaceable in a longitudinal direction of each conveyor.

4. The device as claimed in claim 1, wherein each conveyor can be controlled together with the clamping means on the basis of a chosen path.

5. The device as claimed in claim 1, wherein at least one lateral guide is added to each conveyor.

6. The device as claimed in claim 1, wherein the conveyors are mutually parallel and extend adjacently of each other.

7. The device as claimed in claim 1, further including a cooled support plate in the region of the welding station and forming part of the clamping means.

8. The device as claimed in claim 1, wherein the support plate has an electromagnetic form.

9. The device as claimed in claim 1, wherein the laser is fixedly disposed.

10. The device as claimed in claim 1, wherein the preselected path includes a plurality of sub-paths.

11. The device as claimed in claim 1, wherein the clamping means includes a lower clamping plate and an upper clamping beam.

12. The device as claimed in claim 1, wherein said lateral guide includes guide rollers.

* * * * *